United States Patent

Hopkins

[15] 3,635,169
[45] Jan. 18, 1972

[54] AXLE DRIVE MOTOR MOUNTING

[72] Inventor: Richard G. Hopkins, Bennington Township, Mich.

[73] Assignee: MWA Company, Owosso, Mich.

[22] Filed: Mar. 12, 1970

[21] Appl. No.: 18,908

[52] U.S. Cl....................................105/133, 51/231, 90/48
[51] Int. Cl......................B61f 5/26, B24b 47/02, B23d 7/10
[58] Field of Search............105/133, 131, 132.1, 137, 96.1; 90/48; 143/108 R, 108 A; 51/231

[56] References Cited

UNITED STATES PATENTS

| | | | |
|---|---|---|---|
| 1,710,360 | 4/1929 | Keil | 105/132.1 X |
| 1,965,221 | 7/1934 | De Haas | 51/231 UX |
| 2,026,076 | 12/1935 | Spicer | 105/132.1 UX |

*Primary Examiner*—Joseph Wegbreit
*Attorney*—Whittemore, Hulbert & Belknap

[57] ABSTRACT

A motor drive for a carriage comprising a mounting plate journaled on an axle of the carriage and a reversible motor secured to said mounting plate. The motor has a direct driving connection with the axle. Resilient means are interposed between the mounting plate and an abutment on the carriage to yieldably oppose rotation of the mounting plate and absorb initial reaction shock upon the motor during reversal thereof.

12 Claims, 4 Drawing Figures

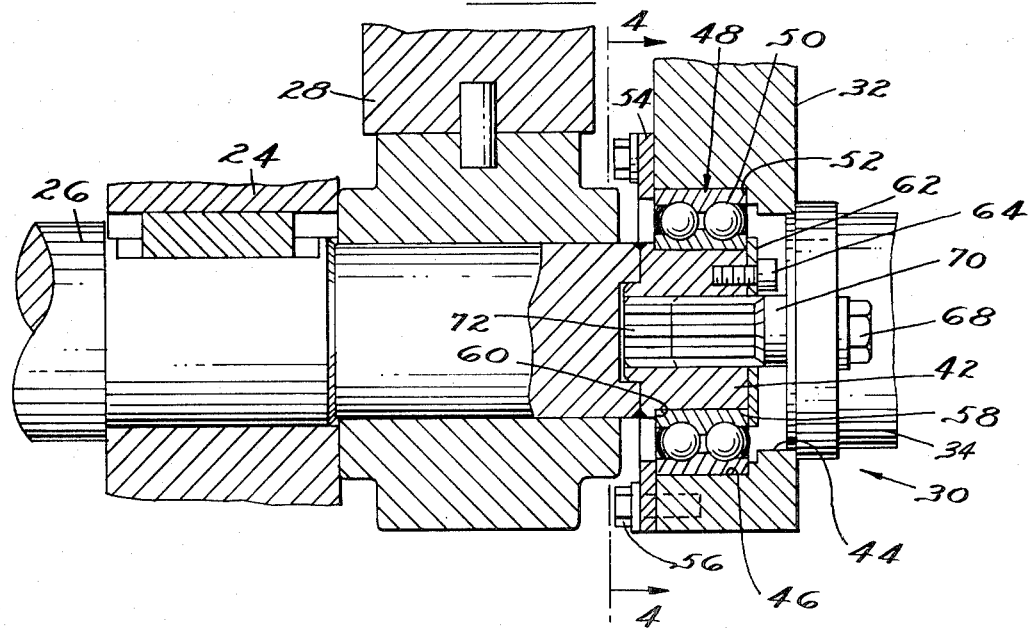
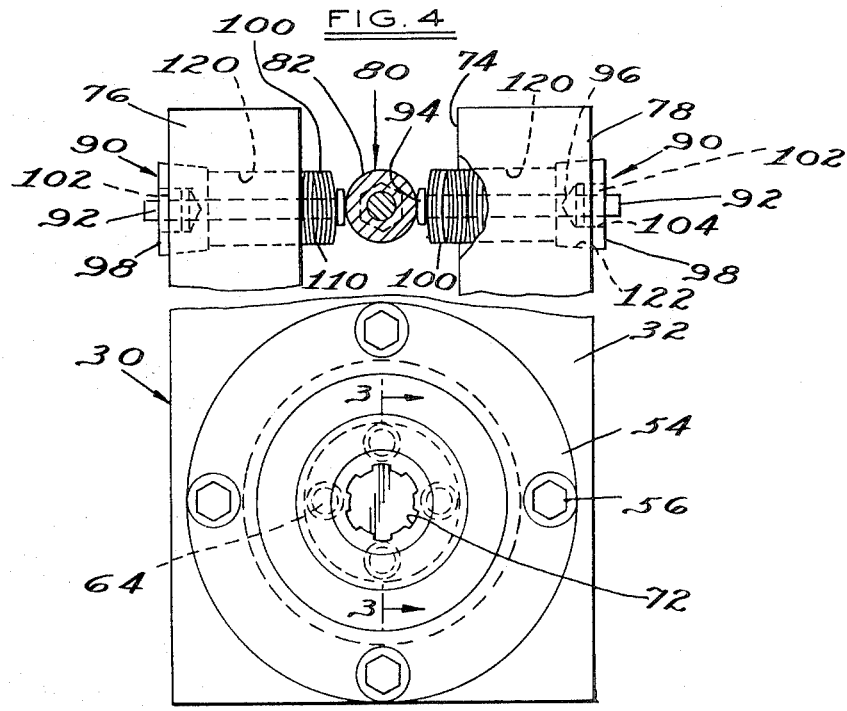

AXLE DRIVE MOTOR MOUNTING

SUMMARY OF THE INVENTION

One object of this invention is to provide a motor drive for a carriage having means to absorb the shock reaction on the motor when it is reversed.

Another object is to provide a reversible motor assembly journaled on the drive shaft of a carriage and having a driving connection with the shaft, and resilient means to absorb the initial shock reaction on the motor assembly when it is reversed.

Another object is to provide a reversible motor assembly including a mounting plate journaled on the carriage shaft and a reversible motor secured to the mounting plate, and resilient means interposed between the mounting plate and an abutment on the carriage.

Another object is to provide resilient means for absorbing shock loads upon motor reversal comprising an axially resilient and compressible unit on the mounting plate.

Another object is to provide a mounting plate having a pair of spaced arms on opposite sides of a carriage abutment, and axially resilient compressible units respectively mounted on the arms of the mounting plate.

Another object is to provide resilient means for absorbing the shock load accompanying a motor reversal comprising a pin mounted on the mounting plate for axial movement to and from an extended position, and a plurality of disc springs on the pin resiliently urging the pin to its extended position.

Another object is to provide disc springs in the form of dished washers arranged in sets, each set comprising two or more washers with the washers of alternate sets being dished in opposite directions.

Another object is to provide a resilient spring unit in the form of a subassembly including the pin and washers as described above, and a plug supporting the pin and serving to mount the same on the mounting plate, the washers being disposed between the plug and the head of the pin.

Another object is to provide a resilient subassembly as described in the preceding paragraph having a nut threaded on the pin which may be used to pretension the washers, the nut normally being disposed in a socket in the plug of substantially the same noncircular outline as the nut but upon axial movement of the pin being displaced from the socket and accessible for adjustment.

Other objects and features of the invention will become apparent as the following description proceeds, especially when taken in conjunction with the accompanying drawings, wherein:

FIG. 3 is a fragmentary sectional view taken substantially on the line 3—3 in FIG. 4.

FIG. 4 is a fragmentary view with parts broken away and in section and with the carriage axle removed, taken substantially on the line 4—4 in FIG. 3.

Figure 1:
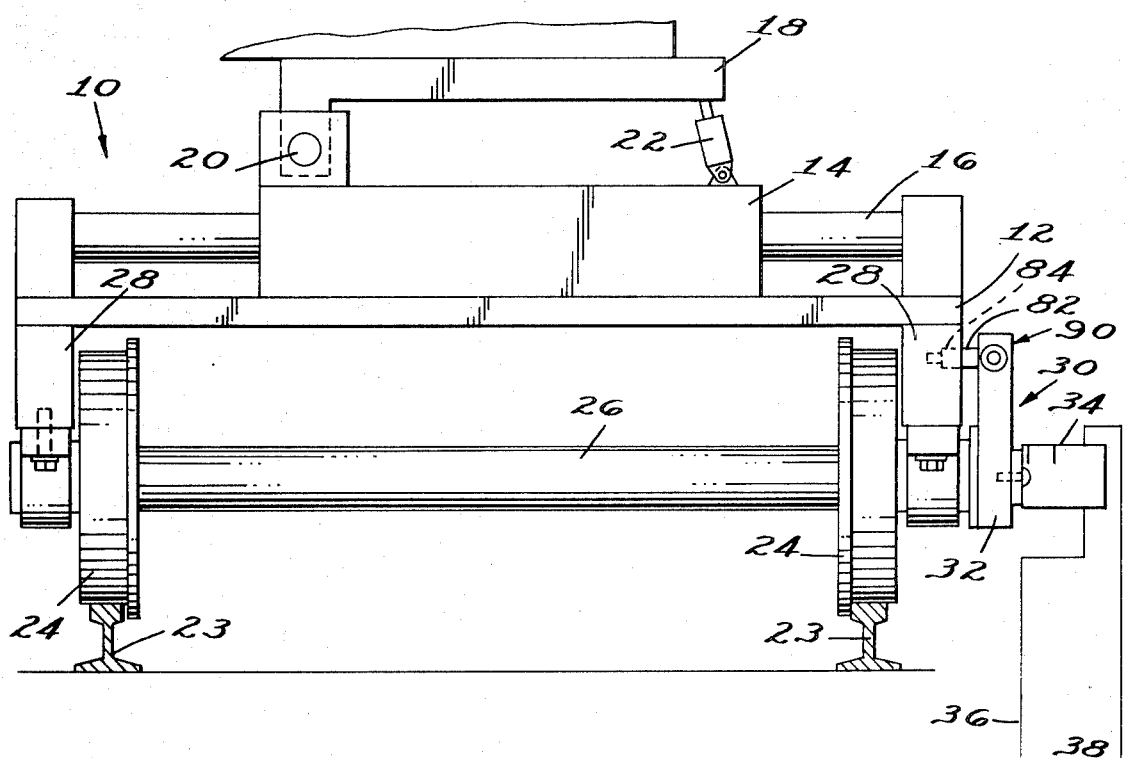
FIG. 1 is a fragmentary front elevational view of a carriage having an axle drive motor mounting, in accordance with my invention.

Referring now more particularly to the drawings, the carriage is generally designated 10 and may for example be provided for supporting a grinder assembly although it will be understood that the invention is not limited to the purpose for which the carriage is used. Thus the carriage is shown as having a base 12, a saddle 14 guided for sliding movement on the base by guide rods 16, and a grinder assembly 18 pivoted on the saddle at 20 for up and down movement by a cylinder assembly 22.

The carriage is supported for movement along tracks 23 by wheels 24 keyed to axles 26 journaled for rotation in pillow blocks 28 at opposite sides of the carriage base 12. Only one such axle 26 is shown in the drawings.

The carriage is adapted to be moved in opposite directions on the tracks 23 by a reversible motor assembly 30 which has a direct driving connection with the axle 26. The motor assembly 30 comprises a mounting plate 32 and a reversible hydraulic motor 34. The motor 34 is driven by a pump P having hydraulic lines 36 and 38 leading to opposite sides of the motor. A reversing valve 40 is diagrammatically shown in FIG. 1 and in the position shown, both hydraulic lines 36 and 38 are open to tank. In a second position of the valve, line 36 is open to pump pressure and line 38 returns to tank to drive the motor 34 in one direction, and in a third position of the valve the lines 36 and 38 are reversed to drive the motor 34 in the opposite direction. A suitable motor M is provided to drive the pump P.

Referring to FIGS. 3 and 4, the mounting plate 32 is journaled upon an extension 42 of axle 26, the extension being welded or otherwise secured to the end of the axle as shown in FIG. 3. The mounting plate 32 has a passage 44 therethrough provided with a large diameter inner portion 46 in which the ball bearing assembly 48 is mounted. The outer race 50 of the ball bearing assembly is clamped in the large diameter portion 46 of the passage against a shoulder 52 by a circular clamping ring 54 removably secured to the inner face of the mounting plate by the threaded fasteners 56. The inner race 58 of the bearing assembly fits on the axle extension 42 and is clamped against the shoulder 60 of the axle extension by a clamping ring 62 secured to the outer end of the axle extension by fasteners 64.

Figure 2:
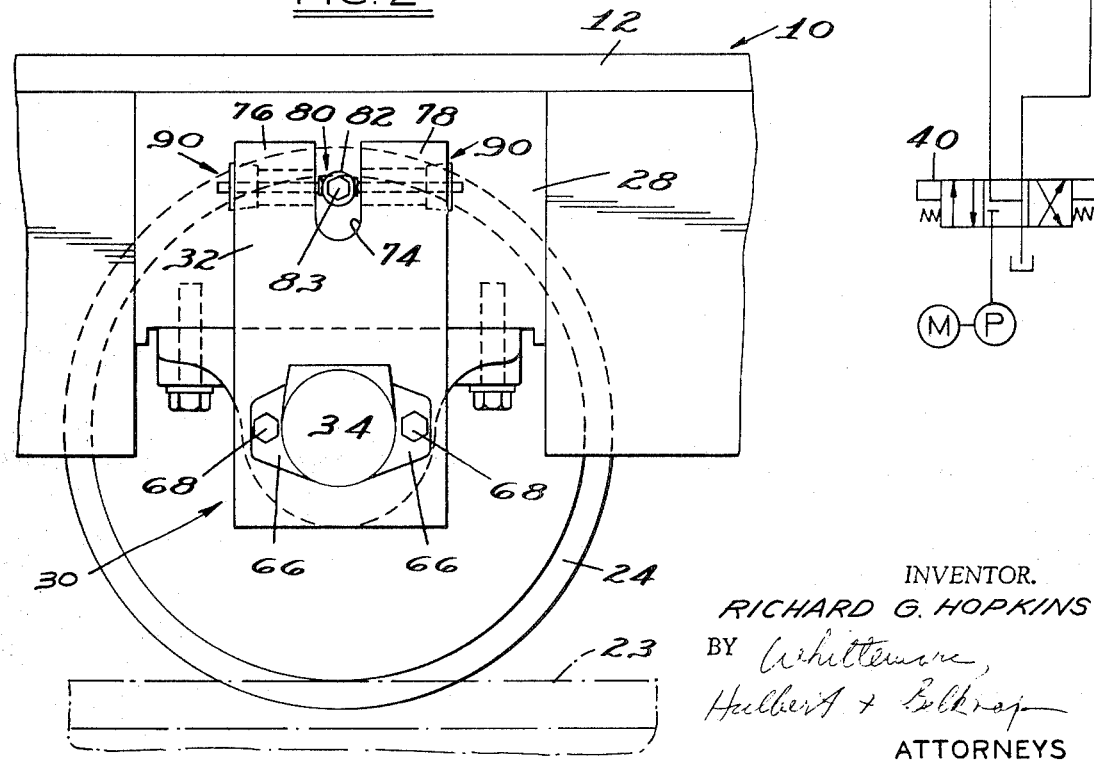
FIG. 2 is an enlarged fragmentary side elevation of the carriage assembly shown in FIG. 1, as viewed from the right.

The motor 34 is removably secured to the outer face of the mounting plate. As seen in FIG. 2, the motor has the laterally extending flanges 66 which are removably secured to the mounting plate by the fasteners 68.

The motor has an output shaft 70 which is axially aligned with the axle 26 and which extends into the passage 44 through the mounting plate and has a driving connection with the axle extension 42. As seen in FIGS. 3 and 4, the axle extension 42 has a splined central passage 72 which receives the splined reduced end of the output shaft 70 of the motor in a direct driving connection.

The mounting plate 32 has a slot 74 extending downwardly from the upper edge of the plate midway between the sides thereof to provide a pair of laterally spaced arms 76 and 78. An abutment 80 mounted in fixed position on the carriage extends into the slot 74 between the arms 76 and 78. Specifically, the abutment is here shown as being in the form of a tubular member or sleeve 82 partially received in a socket 84 in the pillow block 28 and extending horizontally outwardly therefrom between the arms 76 and 78. The sleeve 82 is removably secured to the pillow block 28 by a bolt 83 extending through the sleeve and threaded into the pillow block and having a head on the outer end for retaining the sleeve.

A spring unit 90 is removably mounted upon each arm of the mounting plate 32. Since these spring units are identical, only one will be described and corresponding reference numerals will be applied to each.

Each spring unit 90 is a subassembly adapted for convenient mounting as a unit on the mounting plate 32. The spring unit 90 includes a pin 92 having a head 94 on one end and being threaded on the opposite end. The threaded end of the pin passes through a central axial passage 96 in a tapered threaded pipe plug 98. A plurality of centrally apertured flexible, resilient disc springs 100 are mounted on the pin 92 between the head 94 of the pin and the plug 98. A nut 102 is threaded on the end of pin 92 and is normally disposed in the enlarged socket 104 in the outer end portion of the passage 96 through plug 98. The nut 102 retains the pin 92 in assembly with plug 98 and its external surface has substantially the same noncircular outline as the socket 104 to prevent the nut from rotating. If it is desired to pretension, or to adjust the pretensioning of, the washers 100, this can be done by pressing the pin 92 outwardly to withdraw the nut 102 from socket 104 to make the nut accessible for manipulation on the threaded end of the pin.

The disc springs are preferably in the form of dished washers and are arranged in the sets 110. Each set will be seen to comprise a plurality of washers, and alternate sets are dished in opposite directions. The spring washers are preferably formed of a high-grade spring steel and obviously resist compression under load. The number of washers in each set determines the strength of the spring assembly. Thus if each disc has a 10-pound rating, five of them in a set would have a rating of 50 pounds. The number of sets of washers in the unit 90 does not increase the strength of the spring assembly but it does increase the travel in direct proportion to the number of spring sets.

It is apparent that each spring unit 90 is a subassembly which may be readily mounted on an arm of the mounting plate. Each arm has a through passage 120 for receiving a spring unit, the outer end 122 of the passage being enlarged and provided with a tapered thread to threadedly receive the plug 98. The spring unit is readily inserted into the passage 120 of an arm from the outer end of the passage and the plug rotated to thread it in securely. Suitable spanner wrench slots may be provided in plug 98 for threading it in tightly and for removing it when desired.

As seen in FIGS. 2 and 4, the spring units 90 are aligned with one another, and the heads 94 of the pins 92 are disposed on opposite sides of the abutment sleeve 82, preferably in contact therewith. Since the mounting plate 32 is journaled on axle 26, the reaction force of the motor when it drives the carriage is taken by one spring unit or the other, depending on the direction of motor rotation. When the valve 40 is reversed to move the carriage in the opposite direction, it will be apparent that the motor is subjected to an initial shock load. This shock load however is absorbed and largely taken up by one spring unit 90 or the other to reduce the level of the shock on the motor to a point where it can be tolerated without damage to the motor.

If it should be desired to pretension the spring washers 100, or to change the pretensioning thereof, this can be done by compressing the springs to withdraw nut 102 from the socket 104 in plug 98 so that the nut may be threaded to a new position on pin 92. It is also clear that the spring units 90 are each readily removable and replaceable as a subassembly by merely threading the plugs 98 into or out of threaded engagement with passages 120 in the mounting plate.

What I claim as my invention is:

1. In a carriage assembly having a rotatable drive shaft and adapted to be moved in one direction or the other by the rotation of said shaft, a reversible motor assembly journaled on said shaft and having a driving connection with said shaft, abutment means on said carriage assembly, and resilient means interposed between said motor assembly and said abutment means opposing rotation of said motor assembly.

2. In a carriage assembly having a rotatable drive shaft and adapted to be moved in one direction or the other by the rotation of said shaft, a reversible motor assembly including a mounting plate journaled on said shaft and a reversible motor secured to said mounting plate and having a driving connection with said shaft, abutment means on said carriage assembly, and resilient means interposed between said mounting plate and said abutment means opposing rotation of said mounting plate.

3. The carriage assembly defined in claim 2, wherein said resilient means comprises an axially resilient and compressible unit mounted on said mounting plate.

4. The carriage assembly defined in claim 2, wherein said mounting plate has a pair of spaced arms respectively disposed on opposite sides of said abutment means, said resilient means comprising axially resilient and compressible units respectively mounted on the arms of said mounting plate.

5. The carriage assembly defined in claim 2, wherein said resilient means comprises a pin mounted on said mounting plate for axial movement to and from an extended position, and a plurality of disc springs on said pin resiliently urging said pin to its extended position.

6. The carriage assembly defined in claim 5, wherein said disc springs are in the form of dished washers arranged in at least two sets, each set comprising two or more washers and the washers of said sets being dished in opposite directions.

7. The carriage assembly defined in claim 6, wherein said pin has a head on one end engageable with said abutment means, said washers being interposed between said head and an abutment fixed relative to said mounting plate.

8. The carriage assembly defined in claim 2, wherein said resilient means comprises an axially resilient and compressible subassembly removably secured to said mounting plate and adapted to be removed and replaced as a unit.

9. The carriage assembly defined in claim 8, wherein said subassembly comprises a member removably secured to said mounting plate, a pin extending through said member for axial movement to and from an extended position, said pin having a head on one end, a plurality of dished spring washers interposed between said head and said member, a nut threaded on the opposite end of said pin, said nut normally being disposed in a socket in said member of the same noncircular outline as said nut but upon axial movement of said pin away from its extended position said nut being displaced from said socket and accessible for adjustment to pretension or to change the pretensioning of said washers.

10. The carriage assembly defined in claim 2, wherein said mounting plate has a pair of spaced arms respectively disposed on opposite sides of said abutment means, said resilient means comprising axially resilient and compressible subassemblies respectively mounted on the arms of said mounting plate, said subassemblies being removably secured to said arms and each adapted to be removed and replaced as a unit.

11. The carriage assembly defined in claim 10, wherein each subassembly comprises a plug removably secured to said mounting plate, a pin extending through said plug for axial movement to and from an extended position, said pin having a head on one end engageable with said abutment means, a plurality of disc springs on said pin between said plug and said head resiliently urging said pin to its extended position, said disc springs being in the form of dished washers arranged in sets, each set comprising two or more washers and the washers of alternate sets being dished in opposite directions.

12. The carriage assembly defined in claim 11, wherein each subassembly also includes a nut threaded on the opposite end of the pin thereof, said nut normally being disposed in a socket in said plug of the same noncircular outline as said nut but upon axial movement of said pin away from its extended position said nut being displaced from said socket and accessible for adjustment to pretension or to change the pretensioning of said washers.

* * * * *